(12) United States Patent
Nguyen

(10) Patent No.: US 10,869,159 B1
(45) Date of Patent: Dec. 15, 2020

(54) APPARATUS FOR BATTLEFIELD MANAGEMENT, TARGET LOCATION AND TARGET TAGGING

(71) Applicant: Raytheon Company, Waltham, MA (US)

(72) Inventor: Can Xuan Nguyen, Longmeadow, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/781,295

(22) Filed: Feb. 4, 2020

(51) Int. Cl.
| | |
|---|---|
| *H04W 24/00* | (2009.01) |
| *H04W 4/021* | (2018.01) |
| *H04W 4/18* | (2009.01) |
| *H04W 4/80* | (2018.01) |
| *H04W 4/02* | (2018.01) |
| *H04W 88/02* | (2009.01) |
| *H04M 1/725* | (2006.01) |

(52) U.S. Cl.
CPC .......... *H04W 4/021* (2013.01); *H04W 4/026* (2013.01); *H04W 4/027* (2013.01); *H04W 4/185* (2013.01); *H04W 4/80* (2018.02); *H04M 1/72519* (2013.01); *H04M 1/72522* (2013.01); *H04W 88/02* (2013.01)

(58) Field of Classification Search
CPC ....... H04W 4/021; H04W 4/80; H04W 4/026; H04W 4/027; H04W 4/185; H04W 88/02; H04M 1/72519; H04M 1/72522
USPC ........................ 456/456.3, 550.1, 418, 556.1
See application file for complete search history.

(56) References Cited

U.S. PATENT DOCUMENTS

| | | | | |
|---|---|---|---|---|
| 9,151,572 | B1* | 10/2015 | Sieracki | F41G 3/18 |
| 9,752,840 | B1* | 9/2017 | Betro | F41A 17/06 |
| 2015/0253109 | A1* | 9/2015 | Wichner | G01B 17/00 |
| | | | | 434/19 |
| 2016/0165192 | A1* | 6/2016 | Saatchi | F41C 33/029 |
| | | | | 386/227 |
| 2017/0248388 | A1* | 8/2017 | Young | F41A 19/01 |
| 2017/0292813 | A1* | 10/2017 | Speith | F41A 33/02 |
| 2018/0224241 | A1* | 8/2018 | Havens | G02B 23/105 |

(Continued)

*Primary Examiner* — Danh C Le
(74) *Attorney, Agent, or Firm* — Schwegman Lundberg & Woessner, P.A.

(57) ABSTRACT

Embodiments of an apparatus configured for attachment to a firearm are described herein. In some embodiments, processing circuitry may be configured to process outputs of one or more accelerometers to identify a firearm discharge event, capture firearm orientation data provided by an attitude sensor and a geolocation of the firearm at a time of the firearm discharge event, and encode a firearm discharge message comprising the firearm orientation data, the geolocation, and the time, for transmission via a communication interface. In some embodiments, the apparatus may be configured for target tagging. Some embodiments are directed to a battlefield information node configured to decode a plurality of firearm discharge messages received, via a communication interface, from one or more other battlefield information nodes. Each firearm discharge message may comprise firearm orientation data, a geolocation, and a time associated with a firearm discharge event. The data from the plurality of firearm discharge messages may be aggregated using a sliding time-window to identify target locations in a hostile zone.

14 Claims, 3 Drawing Sheets

(56) References Cited

U.S. PATENT DOCUMENTS

| | | | |
|---|---|---|---|
| 2019/0033425 A1* | 1/2019 | Brown | F41H 11/00 |
| 2019/0162812 A1* | 5/2019 | Sloan | G01S 3/8083 |
| 2020/0003512 A1* | 1/2020 | Deng | G06N 5/04 |
| 2020/0117900 A1* | 4/2020 | Deng | H04W 4/02 |
| 2020/0182580 A1* | 6/2020 | Williams | F41C 27/22 |
| 2020/0232737 A1* | 7/2020 | McClellan | F41G 11/003 |

* cited by examiner

APPARATUS FOR BATTLEFIELD MANAGEMENT, TARGET LOCATION AND TARGET TAGGING

TECHNICAL FIELD

Embodiments pertain to battlefield management. Some embodiments relate to battlefield information networks and the Internet of Battlefield of Things (IBoT). Some embodiments pertain to target location and target tracking. Some embodiments pertain to target tagging.

BACKGROUND

Battlefield status information historically takes a considerable amount of time to propagate to the level of a battlefield decision-making officer, especially when the battlefield has many soldiers. When soldiers are under attack, their priority is to defend themselves against threats. After getting out from harm's way and in a relative safe place, a soldier may have a chance to report through their communication gear information regarding the enemy's behaviors and recent positions. The reconciliation process of combining multiple battlefield reports from different soldiers at different times with a wide range of perspective is very challenging and subjective. A battlefield commander may tend to delay any decision and wait until a clearer picture of battlefield is formed before deciding on the response approach. This latency time becomes an opportunity for an asymmetric enemy to reposition and prepare their next move prior to our future counterattack.

Thus, there is a general need to mitigate any unnecessary delay in battlefield status reporting and provide to battlefield decision makers the battlefield situation in near real-time. There is also a general need to provide current target location information and predicted future target location information to battlefield decision makers. What is also needed is a system that will allow a battlefield commander to be able to execute a counter offensive before an enemy has the chance to disappear into the surrounding environment.

DETAILED DESCRIPTION

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
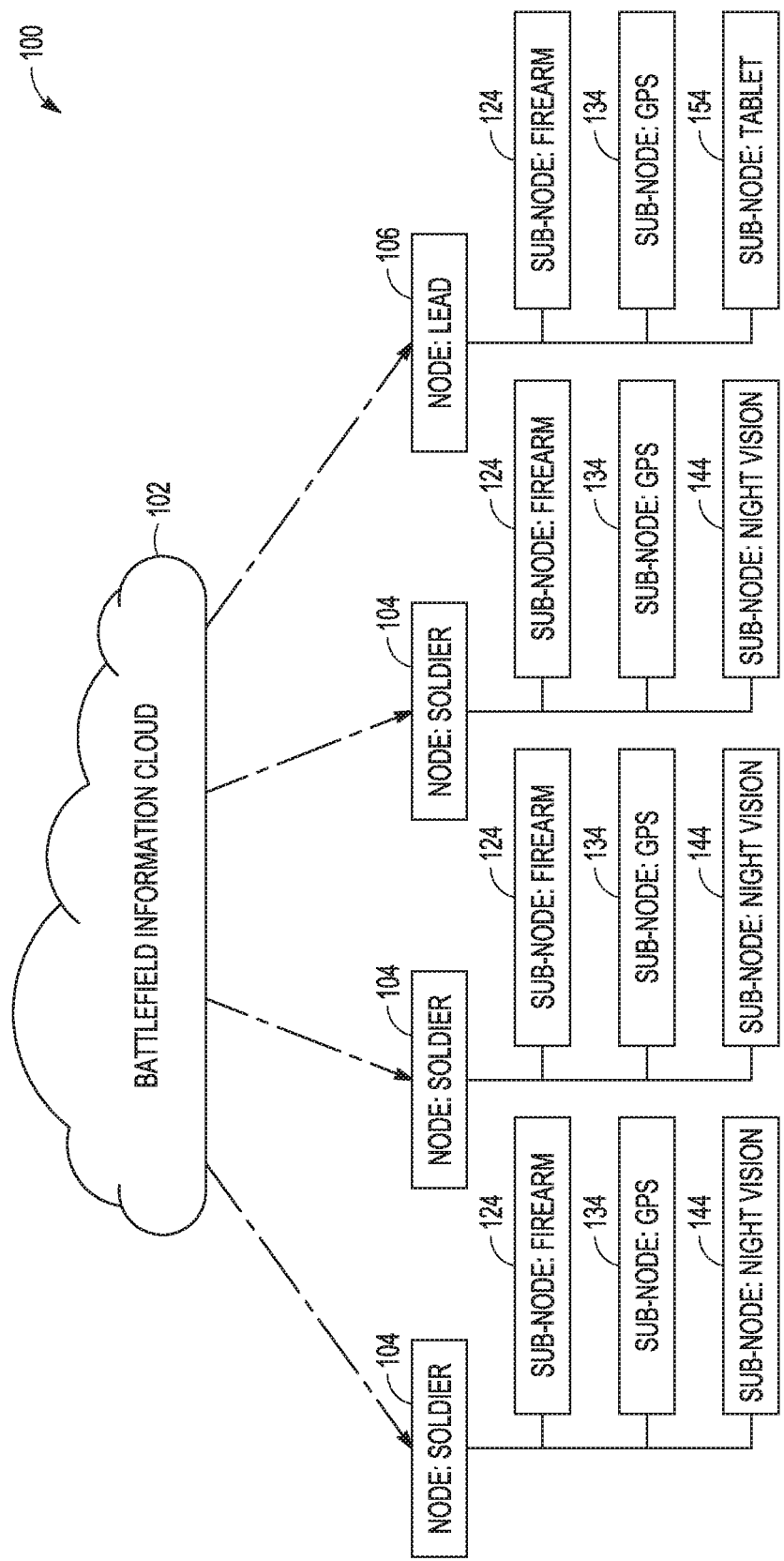
FIG. 1 illustrates a battlefield information network in accordance with some embodiments.

FIG. 1 illustrates a battlefield information network in accordance with some embodiments. The battlefield information network 100 comprises a plurality of battlefield communication nodes, such as one or more soldier nodes 104 and one or more lead nodes 106. The battlefield communication nodes may communicate with each other and with a battlefield information cloud 102. In accordance with some embodiments, battlefield data may be received from the plurality of battlefield communication nodes. The battlefield data from the plurality of battlefield communication nodes may be aggregated to determine one or more target locations. In some embodiments, the battlefield data for each battlefield communication node may comprise firearm-discharge event data. The firearm discharge event data may, for example, comprise a firearm orientation, a firearm discharge time, and firearm location data. The firearm discharge event data may be associated with a single firearm discharge event.

As further illustrated in FIG. 1, each battlefield communication node may be associated with a plurality of sub-nodes. For example, solder node 104 may be associated a firearm subnode 124, a location subnode 134 and a night-vision subnode 144. A lead node 106 may be associated, for example, with a firearm subnode 124, a location subnode 134 and a tablet subnode 154. These embodiments are described in more detail below.

Accordingly, these embodiments allow a battlefield commander to have access to near-real time battlefield information and battlefield statistics. This may allow the battlefield commander to execute a response more quickly. The latency time which would allow for an asymmetric enemy to reposition and prepare their next move prior to a future counterattack may be significantly reduced.

In some embodiments, aggregated battlefield data may be processed to provide battlefield graphics to a battlefield commander. In some embodiments, the aggregated battlefield data may be used to predict future target locations which may be displayed as part of the battlefield graphics. In some embodiments, the battlefield data may be encrypted and/or authenticated. These embodiments are described in more detail below.

In some embodiments, the battlefield information network 100 may also include one or more super nodes (not separately illustrated). These super nodes may operate as shared networking devices among the battlefield communication nodes allowing multiple battlefield communication nodes to connect with a super node for battlefield management and coordination. In some embodiments, a super node may be part of battlefield equipment, such as a land vehicle, a robot, a watercraft, an aircraft or a remotely controlled drone.

Figure 2:
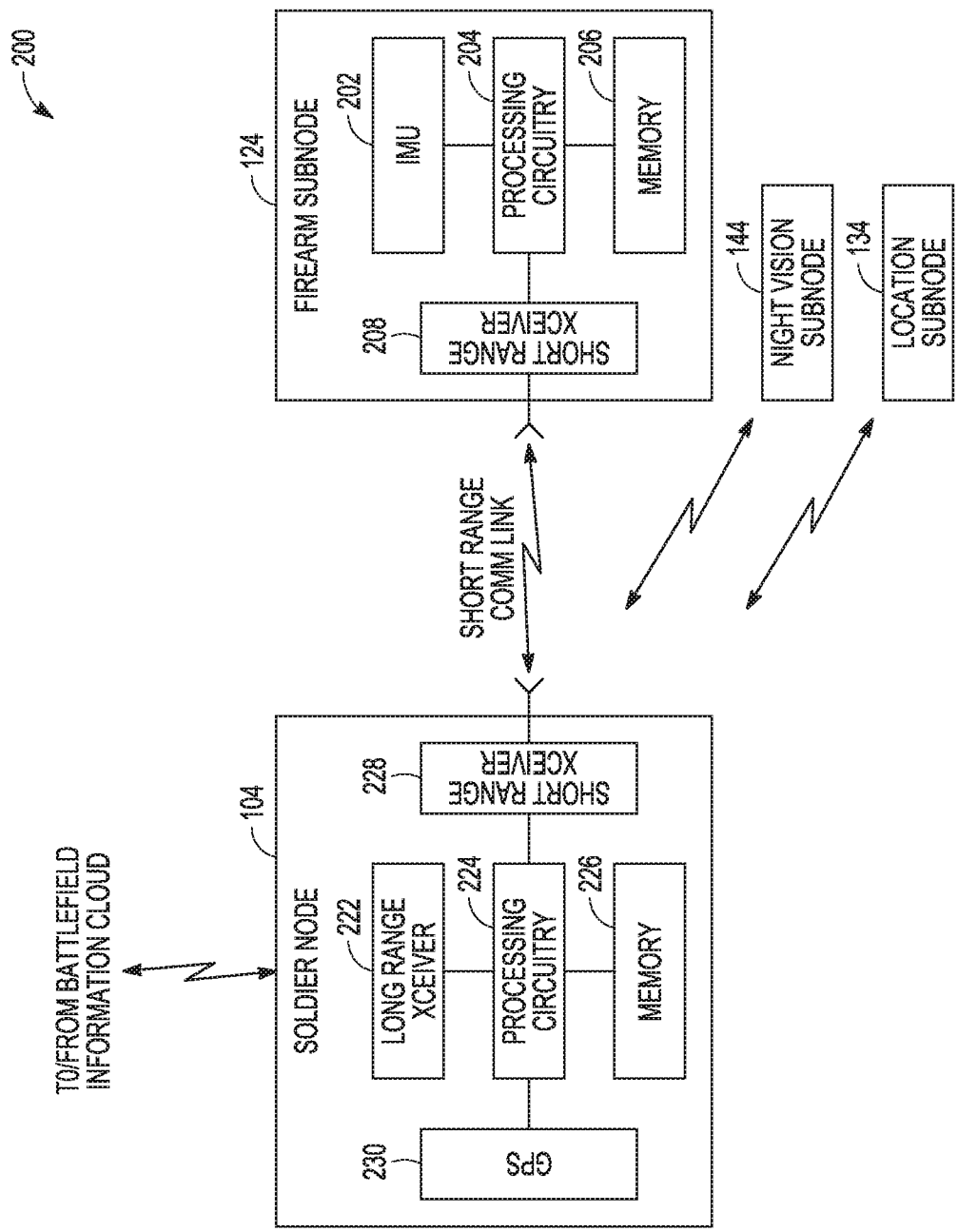
FIG. 2 illustrates a battlefield communication node in accordance with some embodiments.

FIG. 2 illustrates a battlefield communication node in accordance with some embodiments. Battlefield communication node 200 may comprise a soldier node 104, a firearm subnode 124, a location subnode 134 and/or a night-vision subnode 144. Soldier node 104 may comprise a communication interface which may comprise a long-range transceiver 222 for communicating within a battlefield information network 100 (FIG. 1) and a short-range transceiver 228 for communicating with one or more subnodes, such as firearm subnode 124, night-vision subnode 144 and/or location subnode 134. Soldier node 104 may also comprise processing circuitry 224 and memory 226 configured to perform various operations described herein. In some embodiments, solder node 104 may also include a position sensor (e.g., GPS circuitry 230) for performing location determination in-lieu of using a location subnode 134, although the scope of the embodiments is not limited in this respect.

Firearm subnode 124 may comprise a communication interface and inertial measurement unit (IMU) 202 coupled with processing circuitry 204 and memory 206. The communication interface may, for example, comprise short-range transceiver 208. In some embodiments, a firearm subnode 124 may be a wireless computing device that is directly mounted on a standard issue firearm. In other embodiments, a firearm subnode 124 may comprise a wireless computing device that is part of the firearm's optical telescopic sight.

In accordance with embodiments, firearm subnode 124 may identify a firearm discharge event by sensing the vibration and determine gun barrel direction from the IMU 202. IMU 202 may comprise at least one or more accelerometers and an attitude sensor. In some embodiments, firearm subnode 124 may be configured for peer-to-peer (P2P) communication with one or more other battlefield communication nodes 200.

In these embodiments, a firearm's discharge event, firearm's orientation, and/or position from each individual soldier may be captured and encoded into digital messages that may be time-stamped and wirelessly streamed to the battlefield information cloud 102 (FIG. 1). The messages may be stored in a messages database that is accessible to the battlefield commander's computing device (e.g., a tablet subnode 154 (FIG. 1)), which may be part of lead node 106 (FIG. 1). In some embodiments, the lead node 106 may aggregate the firearm discharge events including the firearm orientations and positions from the individual soldiers for use in battlefield management. For example, the aggregated data may be processed to identify a hostile zone which may include the front line, current enemy soldier positions, as well as predicted enemy solder positions.

Figure 3:
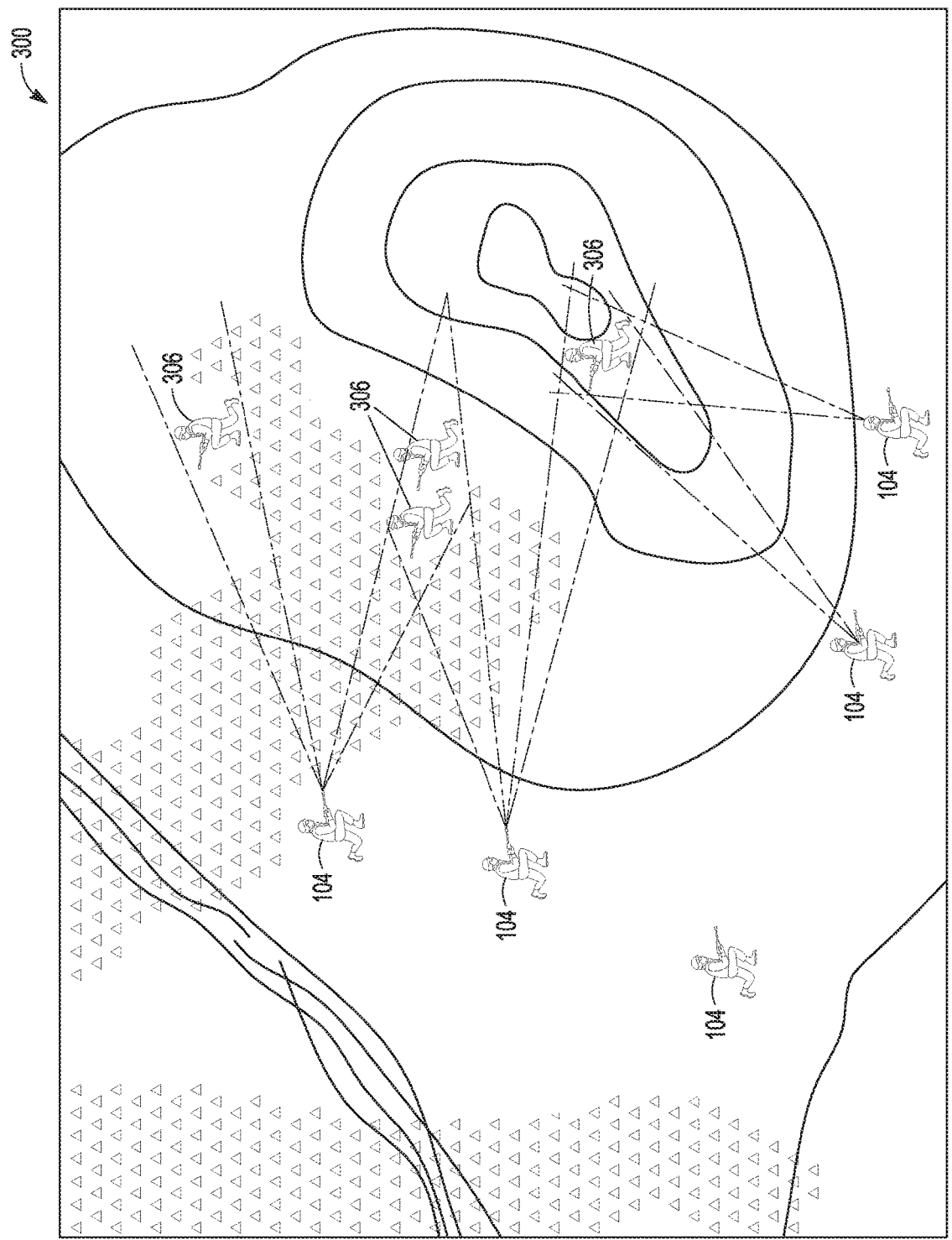
FIG. 3 illustrates a battlefield graphic in accordance with some embodiments.

FIG. 3 illustrates a battlefield graphic in accordance with some embodiments. Battlefield graphic 300 illustrates the location of soldier nodes 104 and locations of targets 306 on a topographic map graphic of an example battlefield. Targets 306 illustrated in FIG. 3 may represent current enemy soldier positions. Battlefield graphic 300 may be generated by a computing device, such as a tablet node 154 (FIG. 1), operated by a battlefield commander.

Some embodiments may be implemented in two IP domains. One domain may be used to capture the battlefield data from battlefield communication nodes 200 (operated by individual soldiers) and provide the data to battlefield commanders. Another domain may be used to process and aggregate the battlefield data for real-time battlefield management. For example, the aggregated data may be graphically displayed, and graphical commands may be translated into multiple messages and send to the appropriate entity (i.e., an individual soldier, external fire support, etc.). Graphical commands may be encoded into multiple messages that are tailored for each affected party.

In some embodiments, a lead node 106 may be configured to graphically display in real-time firearm positions, firearm firing directions and firearm discharge rates for monitoring by a group leader. In these embodiments, the processing circuitry of lead node 106 may be configured to identify targets using artificial intelligence (AI) processing based on an aggregation of firing directions over time. Target positions may be routed to external stakeholders for fire or air support. Individuals or a group of soldiers may be provided information regarding target movement reposition through directional signals and information provided inside the scope's viewfinder.

Referring to FIG. 2, some embodiments are directed to an apparatus configured for attachment to a firearm, such as a firearm subnode 124. In these embodiments, the apparatus may comprise processing circuitry 204, one or more accelerometers, an attitude sensor, and a communication interface. In these embodiments, the processing circuitry 204 may process outputs of the one or more accelerometers to identify a firearm discharge event, capture firearm orientation data provided by the attitude sensor and a capture a geolocation of the firearm at a time of the firearm discharge event. The processing circuitry 204 may also be configured to encode a firearm discharge message comprising the firearm orientation data, the geolocation, and the time, for transmission via the communication interface. In these embodiments, the firearm discharge message may be sent to a soldier node 104 portion of a battlefield communication node 200. The battlefield communication node 200 may be configured to relay one or more firearm discharge messages to one or more other battlefield communication nodes within a battlefield information network.

In some embodiments, the processing circuitry 204 may be configured to timestamp the firearm orientation data and the geolocation with the time of the firearm discharge event and may encode the firearm discharge message to include the timestamped firearm orientation data and timestamped geolocation. The firearm orientation data may comprise a direction that the firearm was pointed to when the firearm was discharged.

In some embodiments, the communication interface may include a short-range wireless transceiver 208 configured to interact with another portion of a battlefield communication node (e.g., a soldier node 104) and may utilize a short-range wireless communication link. In some embodiments, the short-range wireless transceiver 208 may be a spread-spectrum or wide-spectrum transceiver and may utilize a spread-spectrum communication technique for a low-probability of detection. In some embodiments, the short-range wireless communication link may be encrypted. In some alternate embodiments, a wired link may be used instead of a short-range wireless communication link, although the scope of the embodiments is not limited in this respect. In these embodiments, the short-range wireless transceiver may be configured to transmit firearm discharge messages to the soldier node 104. In some embodiments, when the apparatus is part of a firearm subnode 124, the firearm discharge message may be configured to be transmitted, using a short-range wireless protocol, to a soldier node 104 for communication via a battlefield information network 100 (FIG. 1) for aggregation with other battlefield data at a lead node 106 (FIG. 1).

In some embodiments, the location source may be a position sensor may be part of the firearm subnode 124, although the scope of the embodiments is not limited in this respect. In these embodiments, the firearm subnode 124 may comprise a position sensor to generate the geolocation. In some embodiments, the position sensor may be part of the IMU 202, although the scope of the embodiments is not limited in this respect. In some embodiments, the one or more accelerometers and the attitude sensor may be part of the IMU 202.

In some alternative embodiments, the geolocation may be received from a location source external to the firearm subnode 124. In some of these alternate embodiments, the geolocation of the firearm may be provided by an off-board source, such as a separate location subnode 134, or a position sensor (e.g., GPS circuitry 230) that may be part of the soldier node 104.

In some embodiments, the processing circuitry 204 may be configured to implement a firearm discharge pattern detection algorithm to determine if a firearm discharge event has occurred based at least in part on the output signals from the IMU 202. In these embodiments, the processing circuitry 204 may be further configured to generate the firearm discharge message in response to a determination of a firearm discharge event.

In some embodiments, the IMU 202 may be a microelectro-mechanical systems (MEMS) IMU. In these embodiments, the MEMS IMU may be configured to generate IMU readings which may be measured by a three-axis gyroscope, a three-axis accelerometer and/or a three-axis magnetometer to generate 3D measurements of the firearm.

In some embodiments, a battlefield communication node 200 may be configurable for target tagging. In these embodiments, when configured for target tagging, the processing circuitry 204 of a firearm subnode 124 may respond to a first user command for target tagging, capture first target line-of-sight data comprising firearm orientation data provided by the attitude sensor and a geolocation of the firearm at a time of the first user command. In response to a second user command for target tagging, the processing circuitry 204 may capture second target line-of-sight data comprising firearm orientation data provided by the attitude sensor and a geolocation of the firearm at a time of the second user command. In response to a third user command for target tagging, the processing circuitry 204 may generate target location coordinates from the first and second target line-of-sight data and may encode a target sharing message for transmission. The target sharing message may comprise a target location coordinate and the time, for transmission via the communication interface, to another battlefield communication node, such as lead node 106, or to battlefield information cloud 102 (FIG. 1). In these target-tagging embodiments, the battlefield communication node 200 may be configured to relay the target sharing message to one or more other battlefield communication nodes within the battlefield information network.

In these target-tagging embodiments, a battlefield communication node 200 may be configured to decode one or more target sharing messages received from one or more other battlefield nodes and generate a target profile for one or more targets based on the target sharing messages. In these embodiments, the processing circuitry 224 may be configured to generate signaling to allow alignment of the firearm toward one of the targets based on the target profile. In these target-tagging embodiments, the signaling may be an audio signal provided by a soldier node 104. In other embodiments, the signaling may comprise visual signals for displaying on a scope (e.g., an optical scope or night vision scope) or a graphical user interface (GUI) to help the user (i.e., a soldier) align the firearm with the target. In some embodiments, the signaling may be encoded and transmitted to a subnode, such as night-vision subnode 144. These target-tagging embodiments may be useful when a solder does not possess or is not able to use a laser rangefinder.

In some embodiments, a battlefield communication node 200 may include memory 226 and soldier node may include memory 206. The memory may be configured to store data for use by the processing circuitries 204 and 224. The memory may also store instructions for execution by the processing circuitries 204 and 224 for performance of the operations described herein.

Some embodiments are directed to a battlefield communication node, such as battlefield communication node 200 (FIG. 2). In these embodiments, the battlefield communication node 200 may comprise at least processing circuitry 224 and a communication interface. The communication interface may comprise one or more radios, such as long-range transceiver 222 and short-range transceiver 228. The processing circuitry 224 may be configured to decode a plurality of firearm discharge messages received, via the communication interface, from one or more other battlefield communication nodes. Each firearm discharge message may comprise firearm orientation data, a geolocation, and a time associated with a firearm discharge event. In these embodiments, the processing circuitry 224 may aggregate data from the plurality of firearm discharge messages to identify a hostile zone. In some embodiments, the plurality of firearm discharge messages using a sliding time-window to identify the location and boundaries of the hostile zone.

In some embodiments, the processing circuitry 224 may be configured to determine firearm discharge directions from the firearm orientation data and determine the hostile zone based on intersections of virtual lines associated with the firearm discharge directions (illustrated in FIG. 3). In some embodiments, the processing circuitry may further refine the location and boundaries of the hostile zone using aggregated data of additional firearm discharge messages over a period of time.

In some embodiments, the processing circuitry 224 may be configured to encode information representing the hostile zone for transmission to one or more other battlefield communication nodes 200. In these embodiments, the information representing the hostile zone may comprise a geolocation such as geo-coordinates, although the scope of the embodiments is not limited in this respect.

In some embodiments, the processing circuitry 224 may be configured to encode an action request along with the information representing the hostile zone for transmission to one or more other battlefield communication nodes 200. The action request may indicate a particular action to be taken by one of the battlefield communication nodes 200.

Although battlefield communication node 200 (FIG. 2), including soldier node 104, lead node 106, and the various subnodes, are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus configured for attachment to a firearm, the apparatus comprising: processing circuitry; one or more accelerometers, an attitude sensor, and a communication interface, wherein the processing circuitry is configured to:
   process outputs of the one or more accelerometers to identify a firearm discharge event;
   capture firearm orientation data provided by the attitude sensor and a geolocation of the firearm at a time of the firearm discharge event;
   encode a firearm discharge message comprising the firearm orientation data, the geolocation, and the time, for transmission via the communication interface;
   timestamp the firearm orientation data and the geolocation with the time of the firearm discharge event; and
   encode the firearm discharge message to include the timestamped firearm orientation data and timestamped geolocation.

2. The apparatus of claim 1 wherein the communication interface comprises a short-range wireless transceiver configured to interact with a battlefield communication node.

3. The apparatus of claim 1 wherein the apparatus is part of a firearm subnode, and wherein the firearm discharge message is configured to be transmitted to a soldier node for communication via a battlefield information network for aggregation with other battlefield data at a lead node.

4. The apparatus of claim 1 wherein the geolocation is received from a source external to the apparatus.

5. The apparatus of claim 1, further comprising a position sensor to generate the geolocation.

6. The apparatus of claim 5 wherein the one or more accelerometers and the attitude sensor are part of an inertial measurement unit (IMU).

7. The apparatus of claim 5, wherein the processing circuitry is configured to implement a firearm discharge pattern detection algorithm to determine if a firearm discharge event has occurred based at least in part on the output signals from the IMU, and wherein the processing circuitry is further configured to generate the firearm discharge message in response to a determination of a firearm discharge event.

8. The apparatus of claim 7 wherein the IMU comprises a micro-electro-mechanical systems (MEMS) IMU.

9. The apparatus of claim 1, wherein the apparatus is configurable for target tagging, wherein when configured for target tagging, the processing circuitry is configured to:
   in response to a first user command for target tagging, capture first target line-of-sight data comprising firearm orientation data provided by the attitude sensor and a geolocation of the firearm at a time of the first user command;
   in response to a second user command for target tagging, capture second target line-of-sight data comprising firearm orientation data provided by the attitude sensor and a geolocation of the firearm at a time of the second user command; and
   in response to a third user command for target tagging, generate target location coordinates from the first and second target line-of sight data; and
   encode a target sharing message, comprising a target location coordinate and the time, for transmission via the communication interface to the battlefield communication node.

10. The apparatus of claim 9, wherein when configured for target tagging, battlefield communication node is configured to:
    decode one or more target sharing messages received from one or more other battlefield nodes; and
    generate a target profile for one or more targets based on the target sharing messages; and
    generate signaling to allow alignment of the firearm toward one of the targets based on the target profile.

11. The apparatus of claim 1 further comprising memory for storing the firearm orientation data.

12. A non-transitory computer-readable storage medium that stores instructions for execution by processing circuitry of an apparatus configured for attachment to a firearm, wherein the processing circuitry is configured to:
    process outputs of one or more accelerometers to identify a firearm discharge event;
    capture firearm orientation data provided by an attitude sensor and a geolocation of the firearm at a time of the firearm discharge event;
    encode a firearm discharge message comprising the firearm orientation data, the geolocation, and the time, for transmission via the communication interface;
    timestamp the firearm orientation data and the geolocation with the time of the firearm discharge event; and
    encode the firearm discharge message to include the timestamped firearm orientation data and timestamped geolocation.

13. The non-transitory computer-readable storage medium of claim 12 wherein the firearm discharge message is configured to be transmitted to a soldier node for communication via a battlefield information network for aggregation with other battlefield data at a lead node to identify target locations in a hostile zone.

14. The non-transitory computer-readable storage medium of claim 13 wherein the processing circuitry is configured to implement a firearm discharge pattern detection algorithm to determine if a firearm discharge event has occurred based at least in part on the output signals from the IMU, and wherein the processing circuitry is further configured to generate the firearm discharge message in response to a determination of a firearm discharge event.

* * * * *